United States Patent [19]

Gorman

[11] Patent Number: 5,377,999
[45] Date of Patent: Jan. 3, 1995

[54] GUILDED SPLIT PACKING RING

[75] Inventor: G. W. Gorman, Midlothian, Tex.

[73] Assignee: Gorman Company, Inc., Cedar Hill, Tex.

[21] Appl. No.: 963,920

[22] Filed: Oct. 20, 1992

[51] Int. Cl.⁶ ............................................. F16J 15/32
[52] U.S. Cl. ..................................... 277/9; 277/205; 277/220; 277/221
[58] Field of Search .............. 277/205, 216, 218, 219, 277/220, 221, 228, 229, 9

[56] References Cited

U.S. PATENT DOCUMENTS

| | | | |
|---|---|---|---|
| 747,448 | 12/1903 | Lomasney | 277/220 X |
| 2,484,693 | 10/1949 | DeWitt, Sr. et al. | 277/221 |
| 2,639,198 | 5/1953 | Kirkham | 277/205 X |
| 3,554,569 | 2/1967 | Gorman | 277/205 |
| 3,580,765 | 5/1971 | Grove | 277/221 |
| 3,642,291 | 2/1972 | Zeffer et al. | 277/218 X |
| 3,660,192 | 5/1972 | Smith et al. | 277/228 X |
| 3,861,691 | 1/1975 | Wheeler | 277/205 |
| 4,579,352 | 4/1986 | Adang | 277/205 |
| 4,883,279 | 11/1989 | Sabo | 277/228 X |

FOREIGN PATENT DOCUMENTS 476019 11/1937 United Kingdom ................ 277/221

OTHER PUBLICATIONS

"Seals and Sealing Handbook", Jul. 1986, p. 84.
Product brochure for Chevron® Packing manufactured by Garlock, Inc. of Palmyra, New York, No Date.

*Primary Examiner*—Thomas B. Will
*Assistant Examiner*—Scott W. Cummings
*Attorney, Agent, or Firm*—Richard E. Jenkins

[57] ABSTRACT

A guided split packing ring comprising a split in the circumference of the annular body defining a nose at one end and a cavity at the other end for matingly receiving the nose therein. The annular body of the packing ring defines a slightly enlarged outside diameter having an interference between about 0.025 to 0.035 inches when the packing ring is positioned in a hydraulic cylinder so as to urge the ends of the split into sealing engagement.

13 Claims, 3 Drawing Sheets

GUILDED SPLIT PACKING RING

TECHNICAL FIELD

The present invention relates to pressure seal devices. More particularly, it relates to an improved pressure seal or packing member for sealing against a differential pressure and between an internal surface of a cylinder and an outer cylindrical surface of a member disposed therewithin wherein a novel split in the circumference of the pressure seal is provided which allows for breaking apart and reassembling the pressure seal for ease of replacement.

RELATED ART

Two basic types of fluid seal devices of a type suitable for use with a rod and cylinder under pressure loading conditions are well known to those skilled in the art. The first type comprises a stack of V-shaped split seal elements such as manufactured under the trademark CHEVRON® and manufactured by Garlock Inc. of Palmyra, N.Y. This prior art sealing device requires that a plurality of the seals be placed in vertical registration with the splits staggered around the circumference thereof to minimize fluid leakage through the seal. This type of seal, although providing for removal and replacement without the necessity to disassemble the mechanisms operatively connected to the hydraulic cylinder when replacement is required, still suffers from a number of shortcomings including high cost, high friction, and the necessity for fine adjustment which would be well known to one skilled in the art.

The second basic type of pressure seal is the singular U-type seal such as is well represented by applicant's own U.S. Pat. No. 3,554,569 and U.S. Pat. No. 3,861,691 to Wheeler. These singular type of pressure seals, and particularly applicant's own pressure seal described in U.S. Pat. No. 3,554,569, possess great efficacy for initial sealing of hydraulic cylinders but suffer from the shortcoming that removal and replacement of the seals typically requires disassembly of the mechanisms operatively connected to a hydraulic cylinder to permit installation of a new seal between the internal surface of the cylinder and the outer cylindrical surface of the member disposed therein.

An attempt has been made to provide a dynamic seal device of this second type with a split therein, and such a device is disclosed as an alternative embodiment of the invention in the aforementioned U.S. Pat. No. 3,861,691 to Wheeler. The dynamic pressure seal device or packing member disclosed in Wheeler is provided with a split in the circumference thereof to permit installation without requiring disassembly of the mechanisms operatively connected to a hydraulic cylinder in which it is being utilized. However, this prior art seal device possesses recognized shortcomings due to its tendency to leak, and it has never achieved the commercial success in the marketplace that could be expected. Significantly, the Wheeler patent discloses at column 2, lines 43–47, that it is preferable that the pressure seal comprise a continuous annulus since it would be less likely to leak than when a split is provided in the packing member to permit its installation in hydraulic cylinders without requiring disassembly of the mechanisms operatively connected thereto.

Thus, there is a long-felt-need for a single U-type split ring pressure seal (also known as a packing ring or packing member) which does not leak and lends itself for use in substantially all hydraulic cylinder applications so as to enable replacement of the pressure seal device therein without necessitating disassembly of the mechanisms operatively connected to the hydraulic cylinder. Applicant has invented such an advancement in the art with the improved guided split packing ring of the invention which will now be described in specific detail hereinbelow.

DISCLOSURE OF THE INVENTION

In accordance with the present invention, applicant provides an improvement to pressure seals (also known as packing seals or packing members) of the type suitable for use in sealing an annular space between an internal surface of a cylinder and a member having an outer cylindrical surface disposed therewithin. The conventional fluid seal is characterized by an annular body having an inner side and an outer side (each carrying at least one sealing lip), a closed end face, and an at least partially open end face.

The improvement to the above-described conventional fluid seal comprises providing a split in the circumference of the annular body comprising a first end and a second end wherein the first end defines a nose and the second end defines a cavity for matingly receiving the nose therein. Furthermore, and very significantly, the annular body defines a slightly enlarged outside diameter so as to urge the first end and the second end of the split together into sealing engagement when said annular body is positioned in the cylinder annular space.

Accordingly, it is an object of the present invention to provide an improved pressure seal or packing ring of the single U-type which can be replaced in a hydraulic cylinder without requiring disassembly of the mechanisms operatively connected to the hydraulic cylinder.

It is a more specific object of the present invention to provide an improved pressure seal or packing ring of the single U-type which is provided with a split in the circumference thereof for ease of removal and replacement and which can be used in any hydraulic cylinder application without leaking.

It is yet another specific object of the present invention to provide an improved pressure seal or packing member having a leak-proof split in the circumference thereof defining a nose at one end of the split and a cavity at the other end of the split for nestingly receiving the nose, and further comprising a slightly enlarged annular body diameter to urge the nose into the cavity in sealing engagement when the pressure seal or packing ring is positioned in the annular space between an internal surface of a cylinder and a member having an outer cylindrical surface disposed therewithin.

Some of the objects of the invention having been already stated, other objects will now become evident as the description proceeds, when taken in connection with the accompanying drawings described below.

BEST MODE FOR CARRYING OUT THE INVENTION

Figure 1:
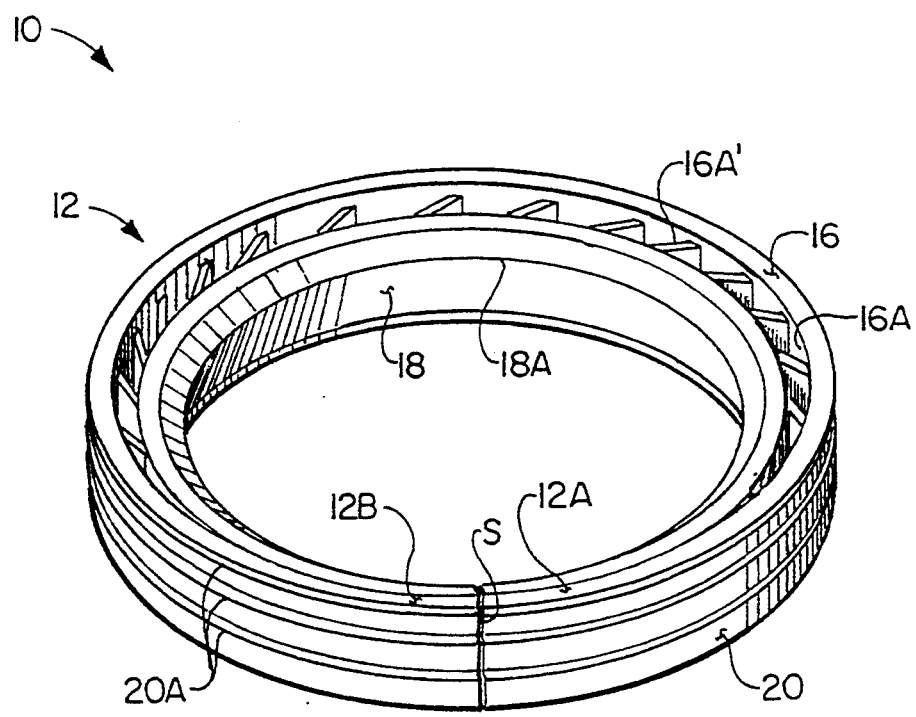
FIG. 1 is a perspective view of the guided split packing ring of the invention in its closed configuration.

Referring now to FIGS. 1-5 of the drawings, the guided split packing ring 10 is generally in the form of an annulus or ring having a body 12, a closed end face 14 (see FIGS. 4 and 5), an open end face 16, an inner side 18 and an outer side 20. The open end face 16 has a plurality of openings therein, each of which is the entry of a cavity 16A wherein the cavities 16A are symmetrically disposed within the guided split packing ring body 12, and the body material between adjacent cavities forms ribs 16A'. The depths of cavities 16A are substantially equal with the cavity bottoms and extend to a depth near closed end face 14.

Integrally formed with the guided split packing ring body 12 are a plurality of sealing lips 20A formed on outer side 20 of body 12. A single sealing lip 18A is provided on the inside surface of guided split packing ring body 12. Outer side sealing lips 20A serve to assure a positive static seal, and the single inside sealing lip 18A serves to provide positive sealing and low friction. Ribs 16A' are molded diagonally to provide internal spring action for positive sealing from zero to normal operating pressure of packing ring 10 in a hydraulic cylinder.

The packing ring described hereinabove is substantially identical to the dynamic pressure seal or packing ring described in applicant's own previously issued U.S. Pat. No. 3,554,569, and the descriptive matter of this patent is incorporated herein by reference for details that are omitted herefrom. However, it should be appreciated that the improvement of the invention can be incorporated into all other types of "U" seals such as, but not limited to, the seal disclosed in U.S. Pat. No. 4,526,385 to Wheeler.

Figure 2:
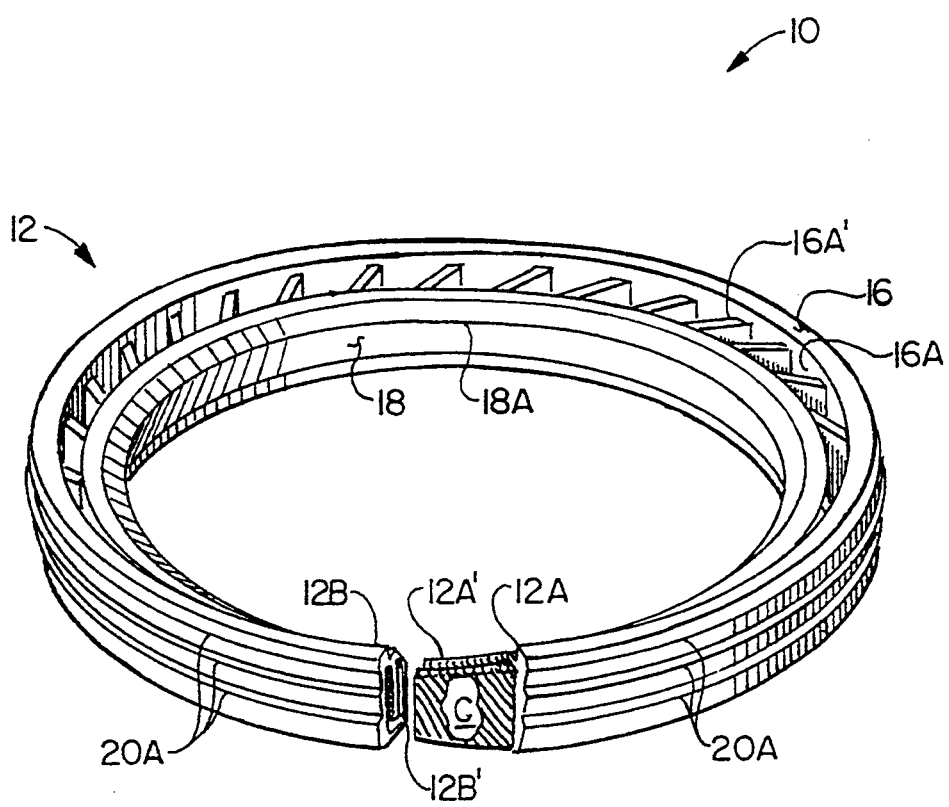
FIG. 2 is a perspective view of the guided split packing ring of the present invention in its broken-apart configuration.
Figure 3:
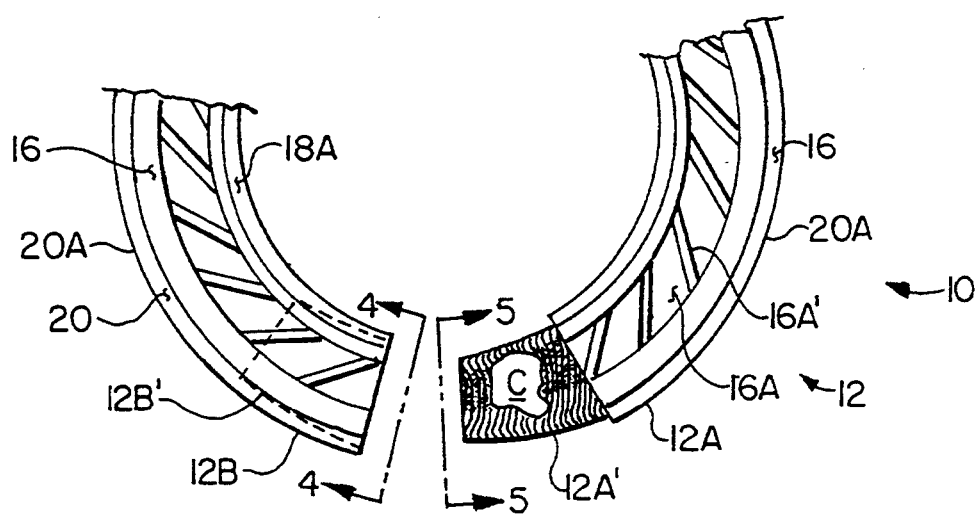
FIG. 3 is a top plan view of the guided split packing ring shown in FIGS. 1 and 2 in its broken-apart configuration.
Figure 4:
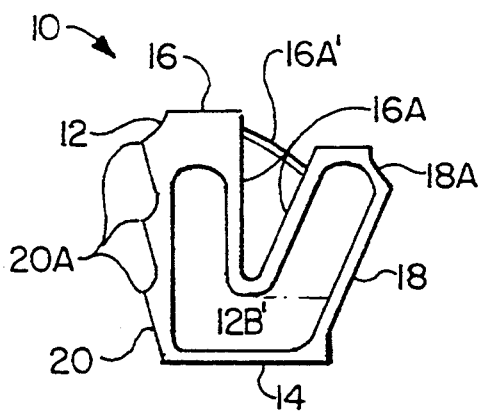
FIG. 4 is a view taken generally along the line 4—4 in FIG. 3.
Figure 5:
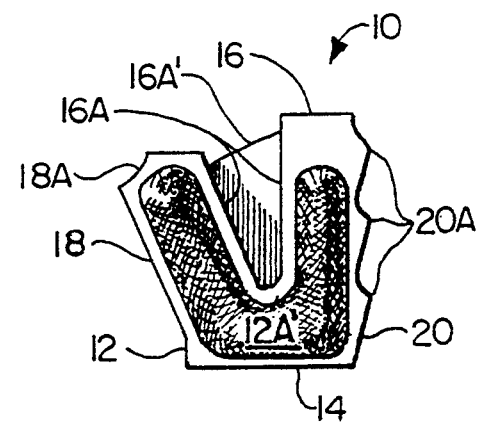
FIG. 5 is a view taken generally along the line 5—5 in FIG. 3.

With reference now to applicant's improvement to previously described packing ring 100, it can be seen that a split S has been provided in the annulus of body 12 so as to define two ends 12A and 12B (see FIGS. 1-3). With particular reference to FIGS. 2, 3 and 5, it can be seen that end 12A defines a protruding nose member 12A' and end 12B defines a cavity 12B' therewithin to nestingly receive nose member 12A' therein when the ends of guided split packing ring 10 are urged into mating engagement.

A second very important feature of applicant's novel guided split packing ring 10 which is not readily apparent from the drawings is that the outside diameter of the annular body 12 is enlarged between about 0.025 to 0.035 inches so that when packing ring 10 is placed into the annular space provided therefor in a hydraulic cylinder, the guided split packing ring of the invention will be slightly oversized so that the annular space will serve to urge ends 12A and 12B into sealing engagement so as to prevent any potential leakage of packing ring 10.

By way of further explanation, it should be appreciated that when applicant manufactures novel packing rings 10 with a conventional outside (packing box) diameter range of about 4 inches to as large as about 17.25 inches, applicant has discovered that these conventional diameters may be selectively enlarged anywhere between about 0.025 to 0.035 inches to effectively serve to urge split S closed when packing ring 10 is positioned in its annular housing portion of a hydraulic cylinder. This feature is believed to be critical to proper sealing of packing ring 10 so as not to leak when in use.

Optionally, applicant also contemplates the use of a sealant compound C on ends 12A and 12B of split S in order to provide even greater sealing efficacy. Although applicant believes that many different types of sealants could be utilized and will be suitable to seal split S, applicant has found that a silicone compound sold under the trade name FORM A GASKET (distributed by Loctite Corporation of Cleveland, Ohio) serves the intended function very well. Typically, the sealant compound C would be applied to one or both ends 12A, 12B of annular body 12 as guided split packing ring 10 is positioned in its designated annular space in a hydraulic cylinder. The sealant compound C advantageously serves to enhance the seal of split S when placed into a hydraulic cylinder and to prevent any leakage due to the provision of split S in packing ring 10 for ease of removal and replacement.

In use, a worn packing ring would be removed from a hydraulic cylinder by merely removing the head or similar element thereof and without disassembly of the mechanisms to which the hydraulic cylinder is operatively secured since novel packing ring 10 will not have to be inserted between the system positioned over the hydraulic cylinder and the hydraulic cylinder. Next, guided split packing ring 10 would be broken apart and positioned directly into the cylinder annular space provided therefor and exposed by the removal of the head or the like of the hydraulic cylinder. Nose member 12A' is inserted into cavity 12B' as packing ring 10 is positioned in its cylinder annular space and the somewhat enlarged diameter of annular body serves to seal split S by urging nose member 12A' forcefully into cavity 12B'.

Optionally, a sealant compound such as FORM A GASKET can be applied to nose member 12A' and cavity 12B' of first and second end 12A, 12B, respectively, prior to sealing engagement thereof in order to further enhance the seal of split 10 in packing ring 10. Very importantly, it should be appreciated that nose member 12A' serves as a guide during insertion of nose member 12A' into cavity 12B' to assure accurate alignment of ends 12A, 12B of annular body 12 and thus to assure a leak-proof seal of split S of novel packing ring 10.

ALTERNATIVE EMBODIMENT

Figure 6:
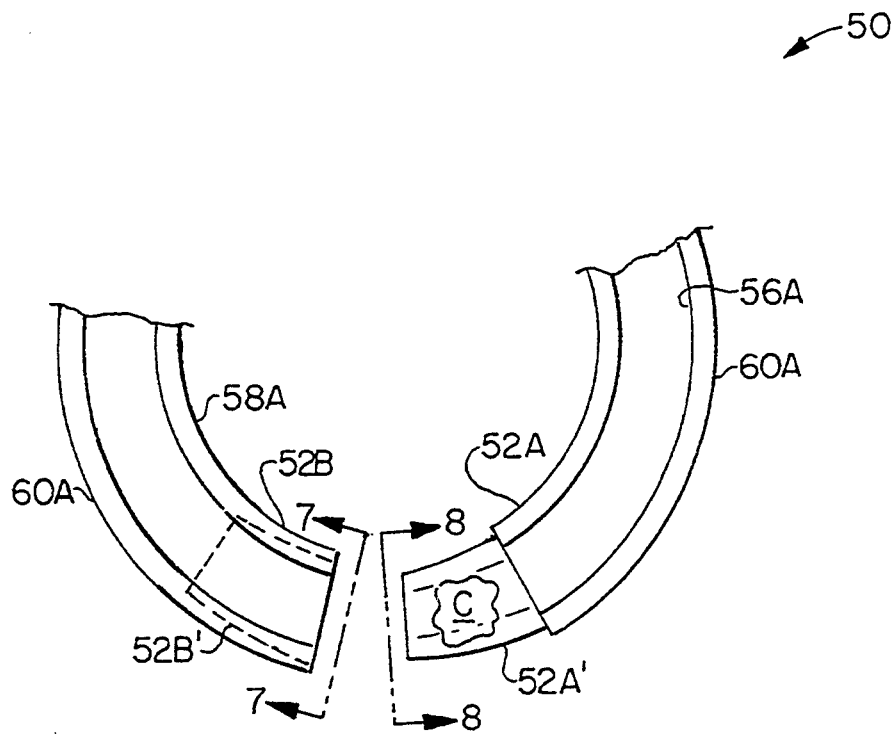
FIG. 6 is a top plan view of an alternative embodiment of the guided split packing ring of the invention.
Figure 7:
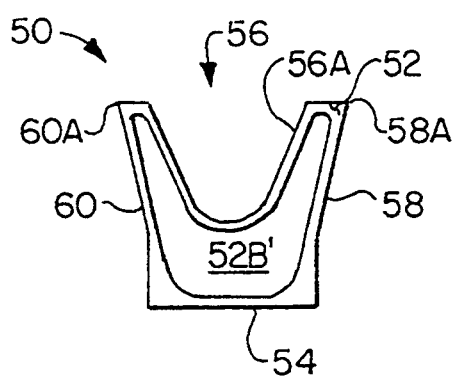
FIG. 7 is a view taken generally along line 7—7 in FIG. 6.
Figure 8:
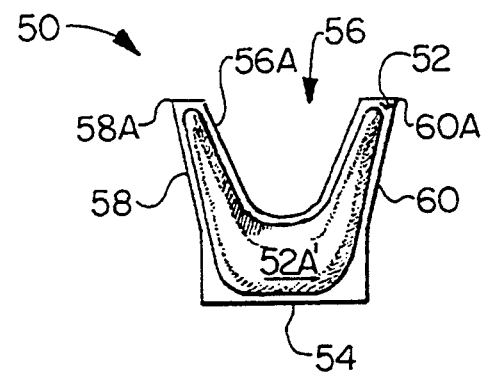
FIG. 8 is a view taken generally along line 8—8 in FIG. 6.

Referring now to FIGS. 6-8 of the drawings, an alterative embodiment of the invention is shown and generally designated as guided split packing ring 50. Packing ring 50 is in the form of an annulus or ring having a body 52, a closed end face 54 (see FIGS. 7 and 8), an open end face 56, an inner side 58 and an outer side 60. Open end face 56 defines a groove 56A within the top surface thereof which extends downwardly to a depth close to end face 54.

Sealing lip 58A and sealing lip 60A are integrally formed with the body 52 of packing ring 50 on the inner side 58 and outer side 60, respectively, thereof. Outer side sealing lip 60A serves to assure a positive static seal, and inner side sealing lip 58A serves to provide positive sealing and low friction.

Whereas packing ring 10 was formed from a rubber compound with an underlying reinforcement fabric from which protruding nose member 12A' was formed, packing ring 50 is formed entirely of a hard rubber compound. A split has been provided in the annular body 52 so as to define two ends 52A and 52B. Referring particularly now to FIGS. 6 and 8, it can be appreciated that end 52A is provided with a protruding hard rubber nose member 52A' and end 52B defines a cavity 52B' therewithin to matingly receive nose member 52A' therein when the ends of packing ring 50 are urged into engagement. Nose member 52A' may be joined to end 52A by bonding or in any other suitable manner.

As with packing ring 10, applicant contemplates that the annular body 52 of packing ring 50 will have an outside diameter enlarged between about 0.025 to 0.035 inches beyond the conventional outside diameter to facilitate sealing engagement of ends 52A and 52B when packing ring 10 is placed into a hydraulic cylinder. Also, as with packing ring 10, applicant contemplates that packing ring 50 may optionally use a sealant compound C on ends 52A and 52B of annular body 52 in order to provide better sealing at the split.

It will be understood that various details of the invention may be changed without departing from the scope of the invention. Furthermore, the foregoing description is for the purpose of illustration only, and not for the purpose of limitation—the invention being defined by the claims.

What is claimed is:

1. In combination a fluid seal device and an annular space between an internal surface of a cylinder and a member having an outer cylindrical surface disposed therewithin wherein said fluid seal device comprises an annular body having an inner side and an outer side, each carrying at least one sealing lip, a closed end face, and an at least partially open end face; the improvement wherein said annular body includes a joint for opening and closing said body to facilitate replacement in said cylinder annular space, said joint comprising:
   (a) a split in the circumference of said annular body comprising a first end and a second end wherein said first end defines a nose and said second end defines a cavity for matingly receiving said nose therein; and
   (b) said annular body further defining a radially enlarged outside diameter relative to said cylinder annular space which is sufficient to urge said first end and said second end together into sealing engagement when said annular body is positioned in said cylinder annular space.

2. In a fluid seal device according to claim 1 wherein said fluid seal device is a singular U-type seal.

3. In a fluid seal device according to claim 1 wherein a sealant material is provided in said annular body split to seal together said first end and said second end of said split.

4. In a fluid seal device according to claim 3 wherein said sealant material is a silicone compound.

5. In a fluid seal device according to claim 1 wherein said fluid seal device comprises a rubber compound with a reinforcement fabric therein and wherein said nose is formed from said reinforcement fabric.

6. In combination a fluid seal device and an annular space between an internal surface of a cylinder and a member having an outer cylindrical surface disposed therewithin wherein said fluid seal device comprises an annular body having an inner side and an outer side, each carrying at least one sealing lip, a closed end face, and an at least partially open end face; the improvement wherein said annular body includes a joint for opening and closing said body to facilitate replacement in said cylinder annular space, said joint comprising:
   (a) a split in the circumference of said annular body comprising a first end and a second end wherein said first end defines a nose and said second end defines a cavity for matingly receiving said nose therein;
   (b) a sealant material provided in said annular body split to seal together said first end and said second end of said split; and
   (c) said annular body further defining a radially enlarged outside diameter relative to said cylinder annular space which is sufficient to urge said first end and said second end together into sealing engagement when said annular body is positioned in said cylinder annular space.

7. In a fluid seal device according to claim 6 wherein said fluid seal device is a singular U-type seal.

8. In a fluid seal device according to claim 6 wherein said sealant material is a silicone compound.

9. In a fluid seal device according to claim 6 wherein said fluid seal device comprises a rubber compound with a reinforcement fabric therein and wherein said nose is formed from said reinforcement fabric.

10. In combination a fluid seal device and an annular space between an internal surface of a cylinder and a member having an outer cylindrical surface disposed therewithin wherein said fluid seal device comprises an annular body having an inner side and an outer side, each carrying at least one sealing lip, a closed end face, and an open end face; and means defining a plurality of cavities symmetrically disposed about the central axis of said body, with each cavity opening at said open end face and extending longitudinally of said body to a depth near said closed end face, said means including ribs symmetrically disposed about the central axis of said body with each rib defining end walls of adjacent cavities; the improvement wherein said annular body includes a joint for opening and closing said body to facilitate replacement in said cylinder annular space, said joint comprising:
   (a) a split in the circumference of said annular body comprising a first end and a second end wherein said first end defines a nose and said second end defines a cavity for matingly receiving said nose therein;
   (b) a silicone compound provided in said annular body split to seal together said first end and said second end of said split; and
   (c) said annular body further defining a radially enlarged outside diameter relative to said cylinder annular space which is sufficient to urge said first end and said second end together into sealing engagement when said annular body is positioned in said cylinder annular space.

11. In a fluid seal device according to claim 10 wherein said fluid seal device is a singular U-type seal.

12. In a fluid seal device according to claim 10 wherein said slightly enlarged outside diameter has an interference between about 0.025 to 0.035 inches when said annular body is positioned in said cylinder annular space.

13. In a fluid seal device according to claim 10 wherein said fluid seal device comprises a rubber compound with a reinforcement fabric therein and wherein said nose is formed from said reinforcement fabric.

* * * * *